(12) United States Patent
Cuschieri (10) Patent No.: US 9,242,708 B2
(45) Date of Patent: Jan. 26, 2016

(54) NEUTRALIZATION OF A TARGET WITH AN ACOUSTIC WAVE

(75) Inventor: Joseph M. Cuschieri, Boca Raton, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 577 days.

(21) Appl. No.: 13/008,809

(22) Filed: Jan. 18, 2011

(65) Prior Publication Data

US 2012/0186422 A1 Jul. 26, 2012

Related U.S. Application Data

(60) Provisional application No. 61/296,414, filed on Jan. 19, 2010.

(51) Int. Cl.
| | |
|---|---|
| *G01S 15/88* | (2006.01) |
| *H04B 1/02* | (2006.01) |
| *B63G 7/08* | (2006.01) |
| *F41H 13/00* | (2006.01) |

(52) U.S. Cl.
CPC .............. *B63G 7/08* (2013.01); *F41H 13/0081* (2013.01)

(58) Field of Classification Search
CPC .............................. F41H 13/0081; B63G 7/08
USPC ......................................................... 367/137
See application file for complete search history.

(56) References Cited

U.S. PATENT DOCUMENTS

| | | | | |
|---|---|---|---|---|
| 3,703,867 | A * | 11/1972 | Madlener et al. ............. | 102/210 |
| 5,894,450 | A * | 4/1999 | Schmidt et al. ............... | 367/134 |
| 6,220,168 | B1 * | 4/2001 | Woodall et al. ............... | 102/411 |
| 6,661,739 | B1 * | 12/2003 | Benjamin et al. ............... | 367/92 |
| 6,766,745 | B1 * | 7/2004 | Kuklinski et al. ............. | 102/402 |
| 7,206,257 | B1 * | 4/2007 | Meng ............................. | 367/137 |
| 7,505,368 | B2 * | 3/2009 | Hamilton ...................... | 367/137 |
| 7,965,583 | B2 * | 6/2011 | Thomas .......................... | 367/16 |
| 8,116,966 | B2 * | 2/2012 | Hougo et al. .................. | 701/112 |
| 8,240,238 | B2 * | 8/2012 | Willner .......................... | 89/1.13 |
| 2003/0223310 | A1 * | 12/2003 | Benjamin et al. ............... | 367/92 |
| 2008/0041264 | A1 * | 2/2008 | Fournier ........................ | 102/403 |
| 2008/0087186 | A1 * | 4/2008 | Blohm et al. .................. | 102/403 |
| 2008/0117718 | A1 * | 5/2008 | Hamilton ...................... | 367/137 |
| 2011/0044467 | A1 * | 2/2011 | Pompei ............................ | 381/77 |
| 2011/0093180 | A1 * | 4/2011 | Hougo et al. .................. | 701/101 |
| 2011/0235465 | A1 * | 9/2011 | Bostick et al. ................... | 367/99 |
| 2011/0235467 | A1 * | 9/2011 | Bostick .......................... | 367/139 |
| 2011/0280100 | A1 * | 11/2011 | Thomas .......................... | 367/16 |
| 2012/0186422 | A1 * | 7/2012 | Cuschieri ....................... | 89/1.13 |

\* cited by examiner

*Primary Examiner* — Daniel Pihulic
(74) *Attorney, Agent, or Firm* — Hamre, Schumann, Mueller & Larson, P.C.

(57) ABSTRACT

An embodiment of an apparatus includes a transducer array and a controller that is operable to cause the transducer array to generate a signal having a frequency, and to direct the signal toward an object having a resonant frequency that is approximately equal to the frequency of the signal. For example, an embodiment of a mine-hunting-and-neutralizing apparatus may generate an acoustic wave with a transducer array, and may disable or destroy a mine by directing the wave toward the mine. The apparatus generates the acoustic wave having a frequency that is approximately equal to the natural frequency of a component of the mine such that the wave causes the component to resonate in a manner that is sufficient to disable the mine from detonating, or that is sufficient to cause the mine to detonate. For example, if the component is the detonator, then the wave causes the detonator to resonate at an energy level that is sufficient to render the detonator unable to detonate the mine, or that is sufficient to cause the detonator to detonate the mine.

8 Claims, 6 Drawing Sheets

NEUTRALIZATION OF A TARGET WITH AN ACOUSTIC WAVE

CLAIM OF PRIORITY

The present application claims the benefit of U.S. Provisional Patent Application Ser. No. 61/296,414 filed on Jan. 19, 2010, which application is incorporated herein by reference in its entirety.

SUMMARY

An embodiment of an apparatus includes a transducer array and a controller that is operable to cause the transducer array to generate a signal having a frequency, and to direct the signal toward a target having a resonant frequency that is approximately equal to the frequency of the signal.

For example, an embodiment of a mine-hunting apparatus may generate an acoustic signal (hereinafter acoustic wave) with a transducer array, and may disable or destroy a mine by directing the wave toward the mine. The apparatus generates the acoustic wave having a frequency that is approximately equal to the natural frequency of a component of the mine such that the wave causes the component to resonate in a manner that is sufficient to disable the mine from detonating, or that is sufficient to cause the mine to detonate in a controlled manner for neutralization. For example, if the component is the detonator, then the wave causes the detonator to resonate at an energy level that is sufficient to destroy or damage the detonator and render the detonator unusable and unable to detonate the mine, or that is sufficient to cause the detonator to detonate and neutralize the mine.

BRIEF DESCRIPTION OF THE DRAWINGS

Unless otherwise noted, like numbers reference like components throughout the following drawings.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Figure 1:
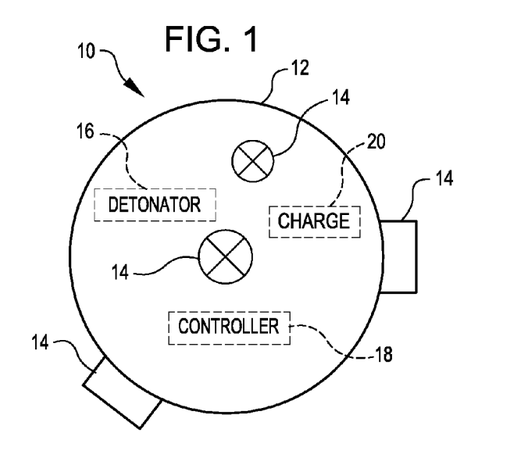
FIG. 1 is a side view of an embodiment of a mine.

FIG. 1 is a side view of an embodiment of a water mine 10, which is an explosive device that is laid in the water column (a moored mine) or on the seafloor (a bottom mine), typically for the purpose of damaging or destroying enemy vessels such as ships or submarines. Where the mine 10 is laid in the water column, one may provide the mine with a level of ballast that causes the mine to "hover" at a corresponding depth beneath the ocean surface. Furthermore, one may design the mine 10 to detonate when a vessel contacts the mine (i.e., a contact mine) or when a vessel comes within a certain distance of the mine (i.e., an influence mine), and he/she may provide the mine with a charge sufficient to damage, sink, or otherwise disable or destroy the vessel that causes the detonation and any other vessels within the range of the mine.

The mine 10 may include a housing 12, one or more sensors 14, a detonator 16, a controller 18, and a charge 20; the mine may also include other components that are omitted from FIG. 1, or may omit one or more of the listed components.

The housing 12 may be formed from any material, such as metal or plastic, suitable for protecting the detonator 16, controller 18, charge 20, and any other internal components of the mine 10, from the potentially harsh environment within which the mine is deployed. Although the housing 12 is shown as being spherically shaped, the housing may have any suitable shape.

The sensors 14 are operated to detect the presence of a nearby object such as an enemy vessel, and in response to such detection, are operable to signal the controller 18, which in response to the signal(s) from the sensor(s), is operable to cause the detonator 16 to ignite the charge 20 and to thus cause the mine 10 to explode. For example, if the mine 10 is a contact mine, then at least one sensor 14 signals the controller 18 in response to the sensor contacting an object; similarly, if the mine 10 is an influence mine, then at least one sensor signals the detonator in response to detecting a stimulus generated by the object. In the latter example, such a stimulus may be, e.g., an acoustic wave that matches a signature stored or otherwise recognized by the controller 18, a change in temperature, a change in pressure, or a change in an electric or magnetic field. Alternatively, if the mine 10 lacks the controller 18, then the sensors 14 may provide their respective object-detection signals directly to the detonator 16. Furthermore, the sensors 14 may include magnets or other devices for attaching the mine 10 to the detected object. Alternatively, the mine 10 may lack the sensors 14 but be designed such that the housing 12 acts as a sensor.

As discussed above, the detonator 16 detonates the charge 20 in response to an object-detection signal from the controller 18 or directly from the sensors 14. For example, the detonator 16 may include a battery or other power source, and may detonate the charge 20 by igniting the charge with a spark, a heated element, or a chemical reaction.

The controller 18 generally controls the operation of the mine 10 by controlling the components (e.g., the sensors 14 and the detonator 16) of the mine. For example, as discussed above, the controller 18 may activate the detonator 16 to ignite the charge 20 in response to a signal received from a sensor 14. If the mine 10 is a "smart" mine, then the controller 18 may also analyze the signature(s) of the signal(s) from the sensor(s) 14 to determine if the object is an enemy vessel, or, e.g., a friendly vessel or a naturally occurring object such as a large sea creature, and may activate the detonator 16 only if the controller determines that the object is an enemy vessel or another target of interest.

The charge 20 may be any substance material, such as an explosive, that explodes, or otherwise causes the mine 10 to explode, when ignited by the detonator 16.

Still referring to FIG. 1, techniques for neutralizing a mine such as the mine 10 have been developed.

For example, a first mine-neutralization method is to use a surface vessel towing a mine-neutralization device linked to the surface vessel by cable and wire for power and data purposes, and the mine-neutralization device generates a magnetic and acoustic signature that will cause the mine to detonate.

But such an approach may be very time consuming, and may bring the surface vessel into the mine field (the range of the mine), thus potentially endangering the ship, crew, and the mine-neutralization device.

A second mine-neutralization method is the use of an expendable vehicle or device that is self propelled and that has sensors to reacquire the mine. The device carries a shaped charge that neutralizes the mine by sympathetic detonation or by damaging the mine components, thus rendering the mine inoperative.

But such a device is typically a onetime-use-only device, and thus may be very costly to deploy when clearing a large number of mines.

A third mine-neutralization method is that once a mine has been located and identified, a diver or an unmanned vessel may attach a charge (separate from the charge 20) to the mine, and one may remotely detonate the attached charge to neutralize the mine after the diver or unmanned vessel, and any other nearby vessels, have retreated to safe distances.

But such a charge-attachment technique carries the risk that the mine may explode in response to the attachment of the charge to the mine or to the influence of the diver or vessel in the vicinity of the mine, or otherwise before the diver or unmanned vessel can retreat to a safe distance. For example, if the mine is a contact mine, then the mere act of attaching the charge to the mine may cause the mine to explode immediately, or within a time too short to allow a diver/vehicle to retreat. Or, if the mine is an influence mine, then the mere act of approaching the mine may cause it to explode.

A fourth method for neutralizing a mine such as the mine 10 is by directing a high-power acoustic shockwave pulse toward the mine, where the shockwave causes a vibration in the mine 10 sufficient to detonate the mine or to permanently disable the mine from detonating.

But there may be challenges with the implementation/deployment of such a shockwave-pulse technique. For example, the intensity of a shockwave required to neutralize the mine from a safe distance may be so high that the sizes of the energy source and of the shockwave-generating aperture may be impractical. For example, if it is estimated that the intensity of the shockwave required is 330 dB (relative to 1 µPa, which is the standard reference for all dB values stated herein) or higher, then the power needed to generate such a shockwave may be on the order of hundreds of kilowatts (kW), and the size of the aperture needed to generate such a shockwave may be on the order of a few hundred feet in diameter, width, or length. Furthermore, such a high acoustic intensity may harm nearby fish, mammals, and other wildlife, and even divers who may be significantly farther away the from the shock-generating source than the targeted mine is. For example, if the mine to be neutralized is 500 meters from a source that is generating a shockwave pulse that needs to have an intensity of 330 dB of acoustic pressure at the mine, then such a pulse may deafen or otherwise permanently damage the hearing of a diver at a distance of 100 kilometers (km) or more! And it is generally accepted that an acoustic shockwave pulse even as low as 140 dB may harm fish, underwater mammals, and other underwater life; consequently, a pulse of 330 dB at a distance of 500 meters from the generating aperture may have a devastating influence on marine life over a vast area centered at the shock-generating source.

Still referring to FIG. 1, alternate embodiments of the mine 10 are contemplated. For example, although described as being a water mine, the mine 10 may be modified for use in another medium such as air or ground.

Figure 2:
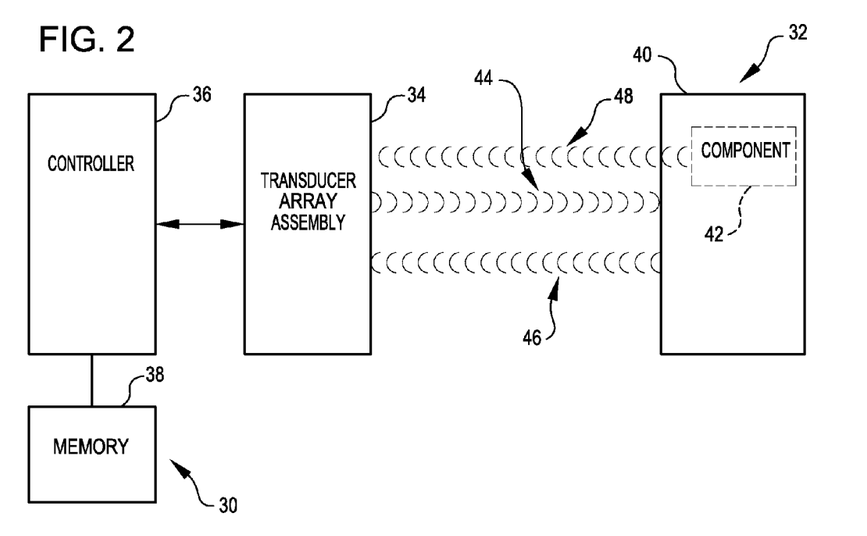
FIG. 2 is a block diagram of a target, such as a mine, and of an embodiment of an apparatus that is operable to identify and neutralize the target.

FIG. 2 is a diagram of an embodiment of an apparatus 30, which may be used to locate, identify, and neutralize an object 32 such as the mine 10 of FIG. 1.

The apparatus 30 includes a transducer-array assembly 34, such as a sonar-array assembly, a controller 36, and a memory 38. The assembly 34, which may include one or more separate transducer arrays, is operable to generate various acoustic waves under the control of the controller 36, and the memory 38 may store instructions executed by the controller or by a processor included or coupled to the controller, and may store object profiles as discussed below.

The object 32 may be a single piece or component, or may include multiple pieces such as a housing 40 and one or more components 42 attached to the outside of the housing or disposed inside of the housing.

Still referring to FIG. 2, an embodiment of a general technique for safely identifying and neutralizing the object 32 is described.

After the object has been located (e.g., by radar, sonar, or another conventional technique) the controller 36 causes one or more transmit arrays of the transducer-array assembly 34 to generate a pulsed acoustic wave 44, which, according to Fourier's theorem, may include multiple component frequencies.

The housing 40 reflects a portion 46 of the pulse 44 back to the assembly 34, which receives this reflected portion with one or more receiving arrays (an array may be dedicated to either transmitting or receiving acoustic waves, or may both transmit and receive acoustic waves. The reflection of the pulse 44 by the housing 40 may be referred to as the scattering of the pulse 44 by the object 32, and the reflected portion 46 may be referred to as a direct reflection of the pulse 44. The controller 30 may also control the elements of the one or more receiving arrays within the assembly 34 to form a beam along which the assembly receives the direct reflections 46, and to control a direction of this receive beam. This may allow the array assembly 34 to receive direct reflections 46 from multiple parts of the object housing 40.

Furthermore, the pulsed wave 44 acts as a "ping" of the component 42 (it may be helpful for one to think of the component as a tuning fork in this circumstance), and thus causes the component to resonate at its natural frequency. The resonating component 42 generates an acoustic wave 48 approximately at the natural frequency of the component, and the transducer-array assembly 34 receives the acoustic wave 48, which may be referred to as a secondary reflection of the pulse 44.

The controller 36 may cause the array assembly 34 to generate additional pulse waves 44 from the same or different locations of the apparatus 30 (the controller may cause the apparatus 30 to move with a motor not shown in FIG. 2, or an external apparatus such as a ship may cause the apparatus 30 to move).

The controller 36 then may identify the object 32 by analyzing the direct and secondary reflections 46 and 48 of the pulse(s) 44 (as well as any other acoustic waves generated by the housing 40, component 42, or other components of the object). For example, from the number of different-frequency secondary reflections 48, the controller 36 may determine, e.g., the number and identities of the components that compose the object 32. Furthermore, from the direct reflections 46, the controller 36 may determine, e.g., the shape of the object 32 and the material from which the housing 40 is formed. And from the combination of this information, the controller 36 may be able to identify the object 32 (e.g., as a mine and the type of mine). For example, the memory 38 may store profiles of different objects in a look-up-table (LUT) format, and the controller 36 may compare the information obtained from the direct and secondary reflections 46 and 48 to these profiles, and may identify the object 32 as the object having the stored profile that best matches the obtained information.

After the controller 36 identifies the object 32, the controller may safely neutralize the object according to a corresponding neutralization protocol stored in the memory 38. For example, if the object 32 is a mine, then the memory 38 may identify the natural frequency of the mine's detonator (which is one of the mine's components). In response to this natural frequency, the controller 36 may cause the array assembly 34 to generate an acoustic wave having approximately the detonator's natural frequency and having a power sufficient to incite a neutralizing level of resonance in the detonator. For example, the neutralizing level of resonance may permanently disable the detonator from igniting the mine's charge, thus effectively disarming the mine, or may cause the detonator to ignite the charge, thus destroying the mine. The array assembly 34 may generate such a neutralizing acoustic wave at a safe distance (e.g., so that the apparatus 30 and nearby vessels are not destroyed if the mine explodes) and at a lower power level that will not harm underwater life beyond a relatively short distance from the source, and that will not have the human-hearing-damaging range of an acoustic shockwave pulse.

Still referring to FIG. 2, alternate embodiments of the object-neutralizing apparatus 30 are contemplated. For example, although described for use in an underwater environment, the apparatus 30 may be designed for use in other liquids, other mediums such as air, ground. Furthermore, to generate the neutralizing acoustic wave having a sufficient intensity, the apparatus 30 may utilize capacitive energy storage (e.g., a large capacitor is charged relatively slowly but discharged relatively rapidly) to generate the neutralizing acoustic wave.

Figure 3:
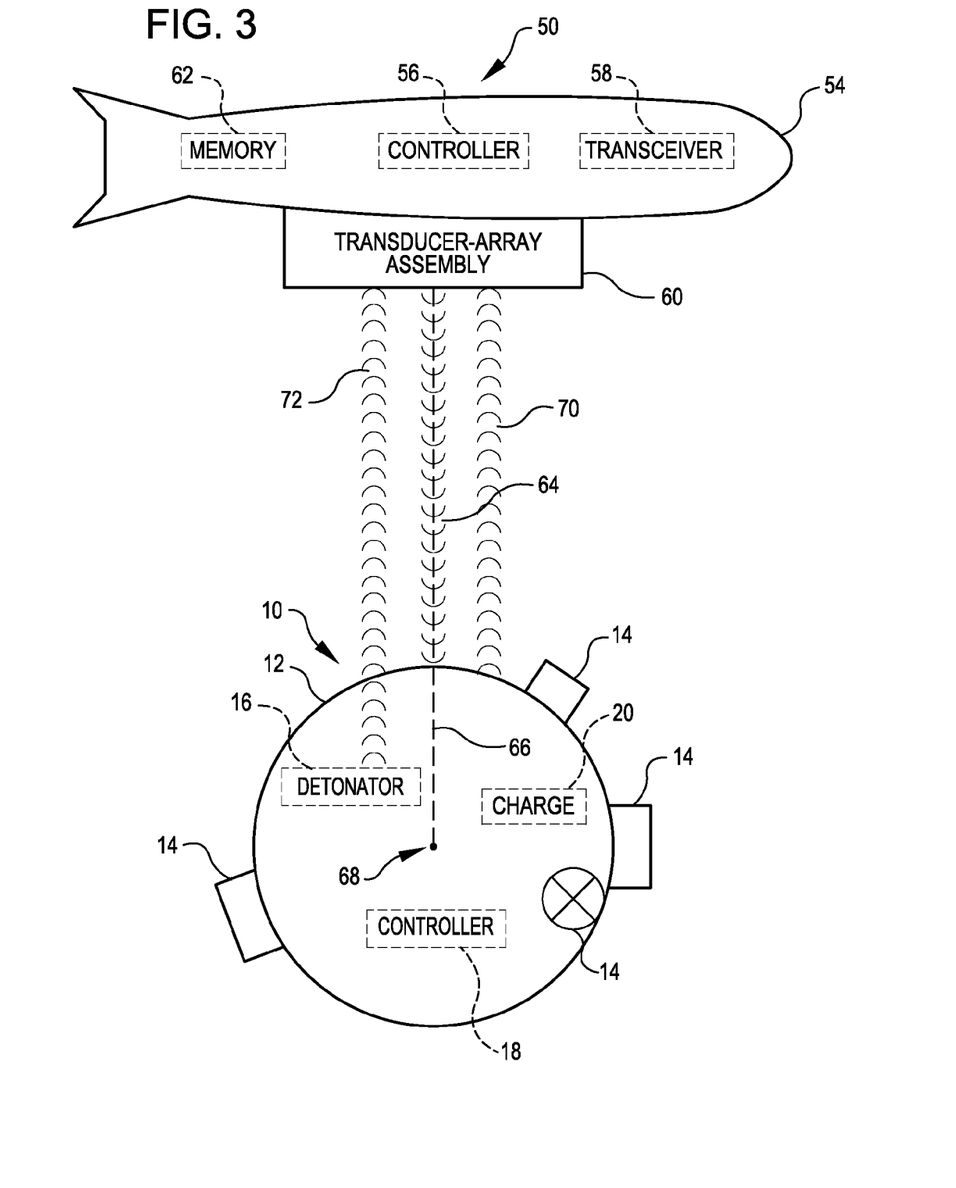
FIG. 3 is a diagram of the mine of FIG. 1 and of an embodiment of a mine-hunting apparatus as it is identifying the mine.

FIG. 3 is a diagram of an embodiment of an unmanned vehicle 50, which is designed to locate, identify, and neutralize a mine, such as the mine 10 of FIG. 1, according to an embodiment of the technique described above in conjunction FIG. 2.

FIG. 3 shows the vehicle 50 while it is analyzing the mine 10 according to an embodiment of a mine-identification technique described below.

The vehicle 50 may be an unmanned underwater vehicle (UUV) having a housing (hereinafter hull) 54, a controller 56, a communication transceiver 58, a transducer-array assembly 60, and a memory 62.

The hull 54 may be formed from any material, such as metal or fiberglass, suitable to protect the controller 56, communication transceiver 58, and any other components disposed within the hull from the water environment in which the vehicle 50 is designed to operate.

The controller 56 may control the communication transceiver 58, array assembly 60, memory 62, possibly other components (such a motor and steering assembly) of the vehicle 50 (if such components are present), and may otherwise control the operation of the vehicle 50 in general. The controller 56 may execute instructions stored in the memory 62, or may include or be coupled to a processor that executes such instructions. In addition or in the alternative, the controller 56 may include a state machine, or it may receive commands from a remote station, such as a surface vessel, via the communication transceiver 58.

The communication transceiver 58 may allow communication between the controller 56 and a remote station such as a surface vessel or submarine. For example, where the station is a surface vessel, the vehicle 50 may include an antenna, and the controller 56 may cause the vehicle to approach the surface such that the antenna extends above the surface to allow the communication transceiver 58 to transmit and receive RF signals. Alternatively, where the station is an underwater vessel, the communication transceiver may transmit and receive acoustic signals via the array assembly 60 or via another transducer array outside of the assembly 60.

Like the transducer-array assembly 34 of FIG. 2, the transducer-array assembly 60 may include one or more separate transducer arrays, and is operable to generate various acoustic waves, such as low-frequency-broadband (LFBB) sonar waves, under the control of the controller 56. For example, the assembly 34 may include a transmit array and a receive array (neither shown in FIG. 3). In an embodiment, the transmit array may be approximately three feet long by twenty inches high, with an active area of approximately twelve inches long by eight inches wide; and the receive array may be approximately four feet long by twenty inches high. And both the transmit and receive arrays may include multiple transducer elements that the controller 56 may independently process, or otherwise control, to shape the transmitted and received acoustic waves into beams, and to control the directions of these beams. For example, the controller 56 may control the gain and phase of each transducer element to generate a beam having a desired shape, width (aperture), and direction relative to the transducer-array assembly 60. Furthermore, an array within the array assembly 60 may act as both a receive array and a transmit array.

And like the memory 38 of FIG. 2, the memory 62 may store instructions executed by the controller 56 or by a processor included in or coupled to the controller, and may store mine profiles as discussed below.

Still referring to FIG. 3, an embodiment of a mine-identification technique is described.

After the mine 10 is located by the vehicle 50 or another apparatus (e.g., according to a conventional locating technique), the controller 56 causes the vehicle to circumnavigate the mine in approximately a circle.

At each arbitrary interval (e.g., every 5° of the 360° circle around the mine 10), the controller 56 causes one or more transmit arrays of the transducer-array assembly 60 to generate a pulsed acoustic wave 64 and to shape the wave into a beam that is directed toward the mine 10. For example, the controller 56 may control the position of the vehicle 50, the direction of the wave 64 beam, or both the apparatus position and the beam direction, such that at each interval, the beam is directed approximately along a radial path 66 toward the center 68 where the mine 10 is located. In an embodiment, the waves 64 may have energies in the range of approximately 195 dB. Furthermore, the length of the radial path 66 may be arbitrary, and may depend on the power of the waves 64 generated by the transducer array assembly 60. For example, the length of the path 66 may be in the range of approximately 100 feet.

The mine housing 12 (and potentially one or more of the sensors 14) scatters each pulse 64 to generate one or more direct reflections 70 of the pulse, and the transducer-array assembly 60 receives these direct reflections.

The transducer-array assembly 60 also receives the secondary reflections 72 of the pulses 64, where, as discussed above in conjunction with FIG. 2, the secondary reflections are acoustic waves generated by, e.g., the pulse-induced vibrations of the housing 12 and the other mine components at their natural frequencies—only the secondary reflections 72 from the mine detonator 16 are shown in FIG. 3.

The controller 56 then generates a profile (sometimes called the frequency-aspect response) of the mine 10 from the direct reflections 70 and the secondary reflections 72 received by the array assembly 60. For example, from frequencies of the secondary reflections 72, the controller 56 may determine, e.g., the number and identities of the components that compose the mine 10. Furthermore, from the direct reflections 70, the controller 36 may determine, e.g., the shape of the mine 10, the material from which the housing 12 is formed, and the number and type of the sensors 14.

And from the generated profile, the controller 56 may identify the type or other characteristics of the mine 10. For example, the memory 62 may store the profiles of different mines in a look-up-table (LUT) format, the controller 56 may compare the generated profile to the stored profiles, and the controller may identify the mine 10 as the mine associated with the stored profile that best matches the generated profile.

Next, the controller 56 may neutralize the identified mine 10, for example, as discussed below in conjunction with FIG. 5.

Still referring to FIG. 3, alternate embodiments of the vehicle 50 and of the described mine-identification technique are contemplated. For example, one or more of the embodiments described above in conjunction with the apparatus 30 of FIG. 2 may be applicable to the vehicle 50 of FIG. 3. Furthermore, the controller 56 may cause the vehicle 50 to circumnavigate or otherwise pass by the mine 10 along more than one path, where each path has a different orientation relative to the mine 10 (for example paths lying in planes that are at known offset distances from the center 68 of the mine); or the controller may cause the apparatus to circumnavigate or otherwise pass by the mine along the same path multiple times. Moreover, although described as being approximately circular, a path along which the vehicle 50 circumnavigates or otherwise passes by the mine 10 may have another shape. In addition, the vehicle 50 may only partially circumnavigate or otherwise pass by the mine 10 along any particular path.

Figure 4:
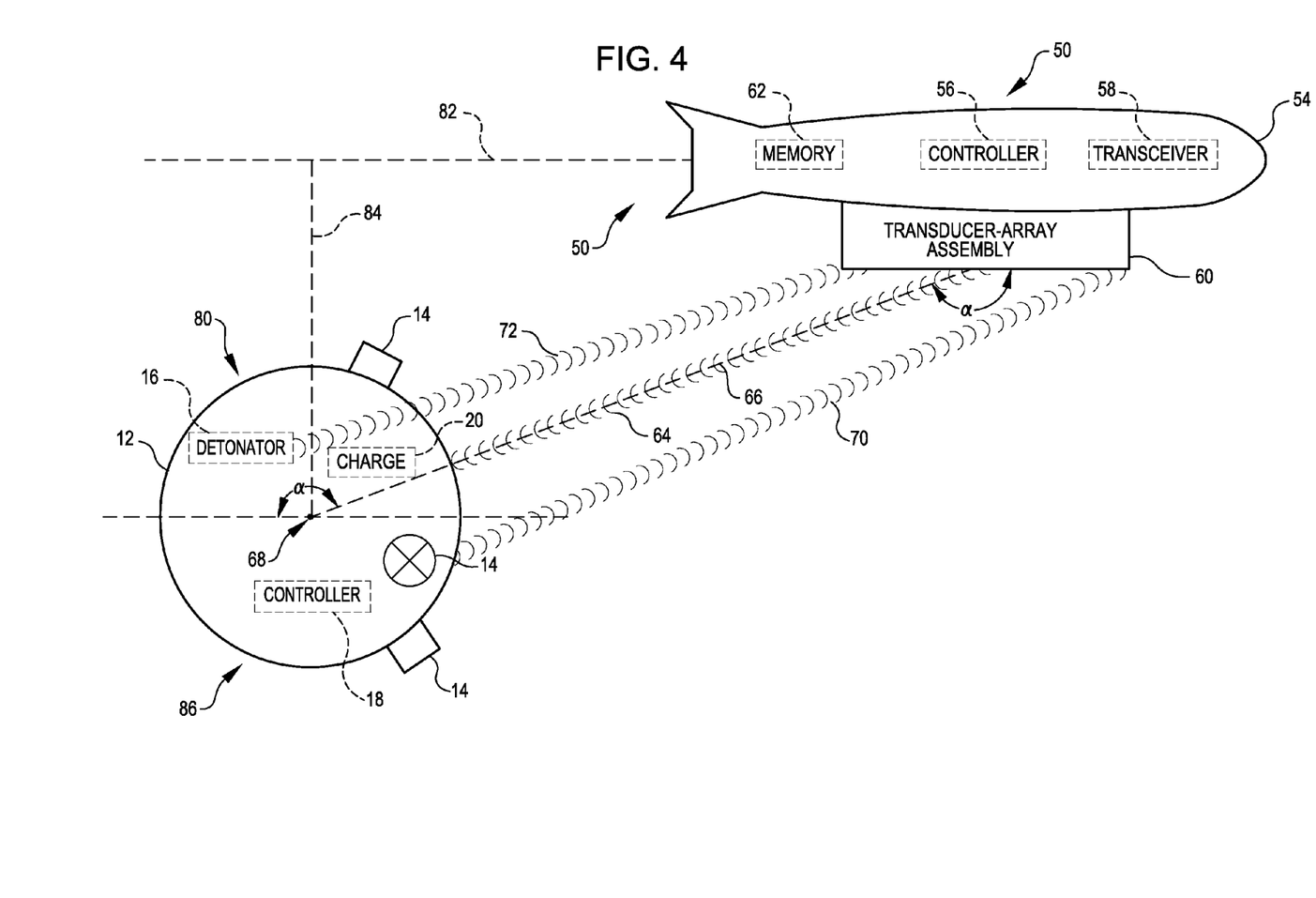
FIG. 4 is a diagram of the mine of FIG. 1 and of another embodiment of a mine-hunting apparatus as it is identifying the mine.

FIG. 4 is a diagram of an embodiment of the vehicle 50 of FIG. 3 while it is analyzing the mine 10 according to another embodiment of a mine-identification technique described below.

Instead of causing the vehicle 50 to circumnavigate or otherwise pass by the mine 10 as described above in conjunction with FIG. 3, the controller 56 causes the vehicle 50 to travel by at least one side 80 of the mine in an approximately straight line 82. The perpendicular distance 84 between the line 82 and the mine 10 (e.g., the center 68 of the mine) may be arbitrary, and may depend on the power of the acoustic waves 64 generated by the transducer-array assembly 60. For example, the distance may be in the range of approximately 75 feet.

For example, the controller 56 may control the position of the vehicle 50, the direction of the wave 64 beam, or both the vehicle position and beam direction, such that at each arbitrary interval (e.g., each 5° interval of the path "squint" angle $\alpha$ described below), the beam is directed approximately along a radial 66 toward the center 68 of the mine 10 to form a squint angle $\alpha$ relative to the transducer-array assembly 60, where a may range from approximately 0° to 180° as the vehicle approaches, passes by, and retreats from the mine. Such a pass by allows the controller 56 to analyze approximately the half 80 of the mine 10 closest to the vehicle 50 from the direct and secondary reflections 70 and 72 in a manner similar to that discussed above in conjunction with FIG. 3. If the mine 10 is symmetrical, then the opposite half side 86 may be similar enough to the half side 80 such that analysis of the half 80 also yields all of the relative information for the half side 86.

Regardless of whether the analysis of the half side 80 yields sufficient information for the half side 86, the controller 56 may then cause the vehicle 50 to travel by the opposite half side 86 of the mine 10 in an approximately straight line (not shown in FIG. 4) in a manner similar to that described in the preceding paragraph, and to analyze approximately the half side 86 of the mine from the direct and secondary reflections 70 and 72 (not shown from the side 86 in FIG. 4).

The controller 56 may then generate a profile of the mine 10 from the direct reflections 70 and the secondary reflections 72 received by the transducer-array assembly 60 from the sides 80 and 82 of the mine 10 in a manner similar to that described above in conjunction with FIG. 3.

And from the generated profile, the controller 56 may identify the type or other characteristics of the mine 10 in a manner similar to that described above in conjunction with FIG. 3.

Next, the controller 56 may neutralize the identified mine 10, for example, as discussed below in conjunction with FIG. 5.

Still referring to FIG. 4, alternate embodiments of the described mine-identification technique are contemplated. For example, one or more of the embodiments described above in conjunction with the apparatus 30 of FIG. 2 and the vehicle 50 of FIG. 3 may be applicable to the vehicle 50 of FIG. 4, and one or more of the embodiments described above in conjunction with the mine-identifying technique of FIG. 3 may be applicable to the mine-identifying technique described in conjunction with FIG. 4. Furthermore, the controller 56 may cause the vehicle 50 to pass by the mine 10 along fewer or more than two paths. Moreover, at least one of the paths may be other than approximately a straight line, or the controller 56 may cause the vehicle 50 to pass by the mine 10 along the same path multiple times. In addition, the vehicle 50 may travel along a path such that a has a range that is less than, or is a subset of, approximately 0° to 180°.

Figure 5:
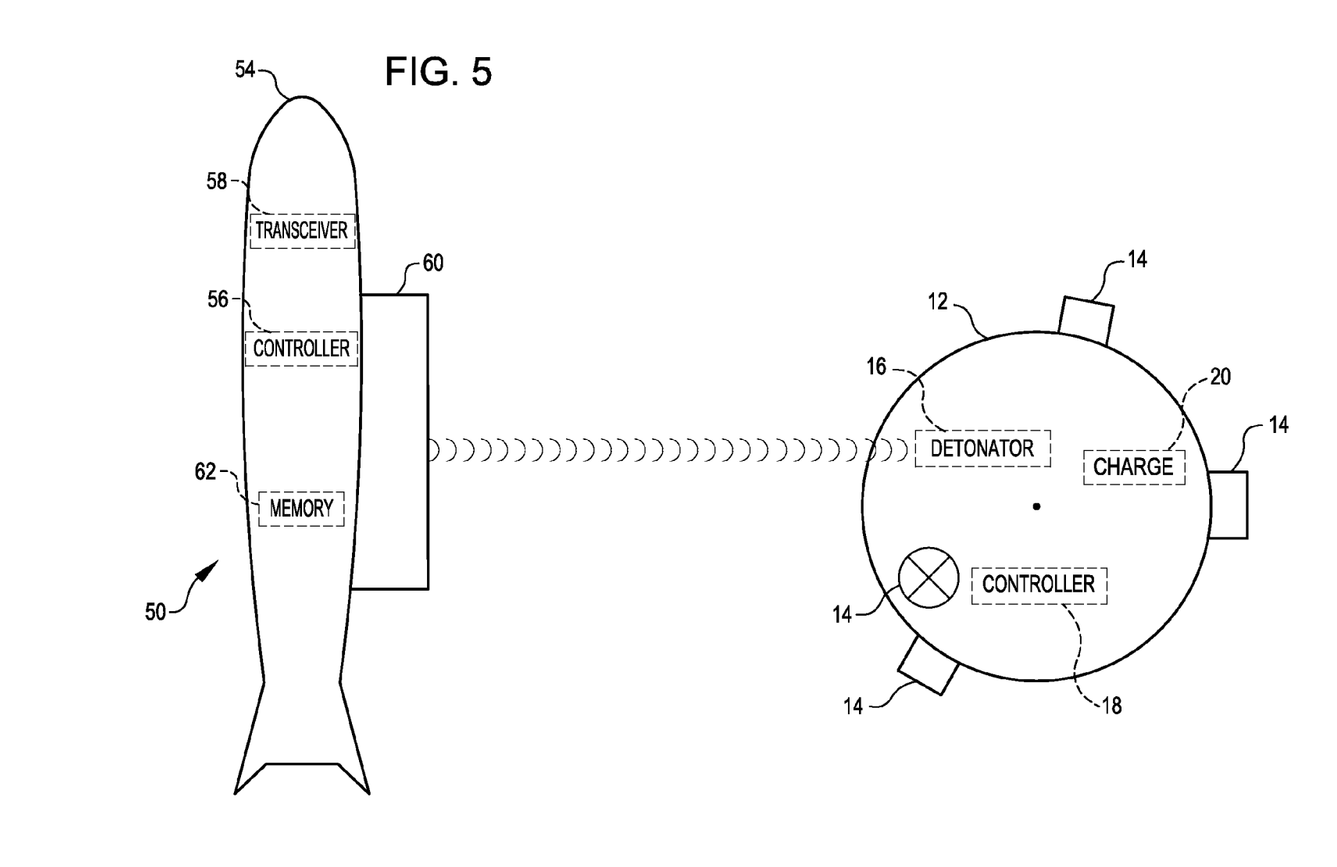
FIG. 5 is a diagram of the mine of FIG. 1 and of an embodiment of a mine-hunting apparatus as it is neutralizing the mine.

FIG. 5 is a diagram of an embodiment of the vehicle 50 of FIGS. 3 and 4 while it is neutralizing the mine 10 according to an embodiment of a mine-neutralizing technique described below.

After the controller 56 identifies the type of the mine 10, it may determine what component or components of the mine may be targeted by an acoustic wave 90 so as to neutralize the mine, where the acoustic wave has a frequency approximately equal to the natural frequencies of the targeted one or more components. Because the neutralizing acoustic wave 90 has a frequency approximately equal to the natural frequency of a targeted component, it may need to be much less powerful, and thus may be less damaging and require much less generating power, than a high-powered acoustic shock wave such as described above in conjunction with FIG. 1.

For example, the memory 62 may store, for each type of mine for which it stores a profile, e.g., a list of components that may be targeted to neutralize the mine, the natural frequencies of these components, and, for each of these components, at least one plot versus distance (for a given beam aperture), of the acoustic power needed to sufficiently vibrate the corresponding component at its natural frequency, i.e., at the frequency of its mechanical resonance, to neutralize the mine. The memory 62 may also store the minimum safe distance from the mine 10 in case the mine explodes in response to being neutralized, and, for each component of the mine, the likelihood that targeting that component will neutralize the mine.

Then, the controller 56 may select one or more components to be targeted by one or more acoustic waves 90 based on, e.g., the minimum safe distance from the mine 10, the acoustic power that the transducer-array assembly 60 may generate, and, for each selected component, the likelihood that targeting that component will neutralize the mine 10.

For example purposes, an embodiment of a mine-neutralization technique is described where the targeted component is the detonator 16, the Q factor of the detonator is approximately eight, the natural frequency of the detonator is in the range of approximately 1-10 kHz, the power of the acoustic wave 90 needed at the mine to sufficiently vibrate the detonator 16 is approximately 230 dB for approximately 100 milliseconds (ms), and thirty meters is a safe distance from the mine 10.

After the controller 56 selects the detonator 16 as the component of the mine 10 to be targeted, it causes the vehicle 50 to move a desired safe distance from the mine (e.g., approximately thirty meters) and into a position such that the transducer-array assembly 60 is directed toward the detonator.

Next, the controller 56 determines the generating power, frequency, and duration of the acoustic wave 90, and the direction of the beam into which the transducer-array assembly 60 will shape the acoustic wave.

The controller 56 may determine the wave generating power from the power of the acoustic wave 90 needed at the mine 10, the distance between the vehicle 50 and the mine, and the attenuation, i.e., the spreading losses, of sea water. For example, where the wave power needed at the mine 10 is approximately 230 dB and the distance between the vehicle 50 and the mine is approximately 30 m, the controller 56 may determine that the transducer-array assembly 60 needs to generate the acoustic wave 90 having a power of approximately 250 dB. Furthermore, the amount of electrical power that the transducer-array assembly 60 may need to generate the acoustic wave 90 at 250 dB may be small enough (e.g., approximately 16 kW only for the relatively brief duration of the pulse) for the vehicle 50 to supply from an onboard power supply (not shown in FIG. 5) without a power connection to a remote station such as a surface vessel.

The controller 56 may determine the frequency and duration of the acoustic wave 90 from a natural frequency and duration specified in the memory 62 for the detonator 16 as being sufficient for neutralizing the mine 10. Because the natural frequency of the detonator 16 may be relatively low (in the range of approximately 1-10 kHz in this example per above), directly generating the wave 90 at this frequency may be energy inefficient, and may require a transducer array having an aperture that is too big (e.g., tens of feet in diameter) for the vehicle 50 to carry. Therefore, the controller 56 may cause the transducer-array assembly 60 to generate the wave 90 as the difference between two other waves at significantly higher frequencies. For example, if the natural frequency of the detonator 16 is approximately 1 KHz, then the controller 56 may use a parametric transducer-array assembly 60 to generate two waves at approximately 150 and 151 KHz, respectively, such that the difference, or "beat", between these two waves results in the wave 90 having a frequency of approximately 1 KHz; the transducer-array assembly may generate these two waves with the same array or with separate but purposely located arrays. Using this difference-frequency generation technique allows the aperture of a transducer array used to generate such a low-frequency signal to have a diameter in the range of, e.g., approximately twelve to twenty four inches, and this aperture may yield a transducer array that is small enough for the vehicle 50 to carry. For example, a parametric transducer array may be suitable for generating a low-frequency acoustic wave 90 using the above-described difference-frequency technique.

And the controller 56 may determine the aperture and direction of the beam (relative to the vehicle 50) into which the transducer-array assembly 60 will shape the acoustic wave 90 based on the maximum acoustic source level specified for the mine 10 in the memory 62 and on the position of the transducer-array assembly relative to the detonator 16. For example, the controller 56 may determine how to drive the elements of the array(s) within the transducer-array assembly 60 that will generate the wave 90 such that the beam has a desired level and a desired angle relative to the transducer-array assembly.

After the controller 56 has positioned the vehicle 50 and has determined the generating power, frequency, and duration of the acoustic wave 90, and the level and direction of the beam into which the transducer-array assembly 60 will shape the acoustic wave, the controller causes the transducer-array assembly to generate the acoustic wave according to these determined specifications.

Then, using the transducer-array assembly 60 or other means (not shown in FIG. 5) on board the vehicle 50, the controller 56 may determine whether the acoustic wave 90 has neutralized the mine 10. For example, if the mine 10 has exploded, then the transducer-array assembly 60 may sense the pressures caused by this explosion, and the controller 56 may determine that the mine is neutralized from these sensed pressures. Or, if the mine has not exploded, the controller 56 may cause the transducer-array assembly 60 to generate a pulse wave 64 focused on the detonator 16, and may analyze the secondary reflections 72 from the detonator, for example, as described above in conjunction with FIGS. 3 and 4. If the secondary reflections 72 indicate that the detonator 16 is still resonating at its natural frequency, then the controller 56 may determine that the detonator is still intact and thus that the mine 10 has not been neutralized, and may generate another acoustic wave 90, perhaps, e.g., at a higher power or from a closer range. But if the secondary reflections 72 indicate that the detonator 16 is resonating at a significantly different frequency, or is resonating only slightly or not at all, then the controller 56 may determine that the detonator is disabled to an extent that it can no longer ignite the charge 20, and thus to an extent that the unexploded mine 10 is, nonetheless, neutralized.

Still referring to FIG. 5, alternate embodiments of the vehicle 50 and of the described mine-neutralizing technique are contemplated. For example, one or more of the embodiments described above in conjunction with the apparatus 30 of FIG. 2 or with the vehicle 50 of FIGS. 3 and 4 may be applicable to the vehicle 50 of FIG. 5. Furthermore, although described as targeting the detonator 16 of the mine 10, the controller 56 may target another component, or multiple components. For example, the controller 56 may cause the transducer-array assembly 60 to direct a first acoustic wave 90 with a first set of characteristics toward a first component of the mine 10, may then cause the transducer-array assembly to direct a second acoustic wave 90 with a second set of characteristics toward a second component of the mine, etc. Moreover, although described in conjunction with an undersea environment, the above-described mine-neutralizing technique may be modified for use in any environment such as in the air and ground (e.g., for land mines).

Figure 6:
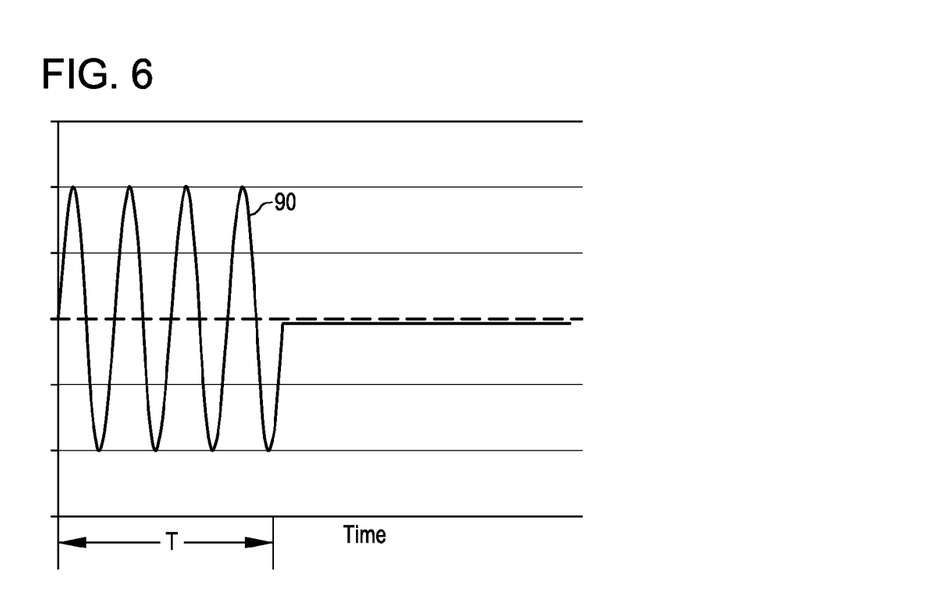
FIG. 6 is a plot of a signal that an embodiment of the mine-hunting apparatus of FIGS. 3-5 may generate to neutralize a mine.

FIG. 6 is a plot versus time of an embodiment of the acoustic wave 90 of FIG. 5. In this example, the wave 90 is an approximate sinusoid having an approximately constant frequency and amplitude over its duration T, which may be in the range of approximately 100 ms. Such a wave 90 may be called a pulsed wave.

Figure 7:
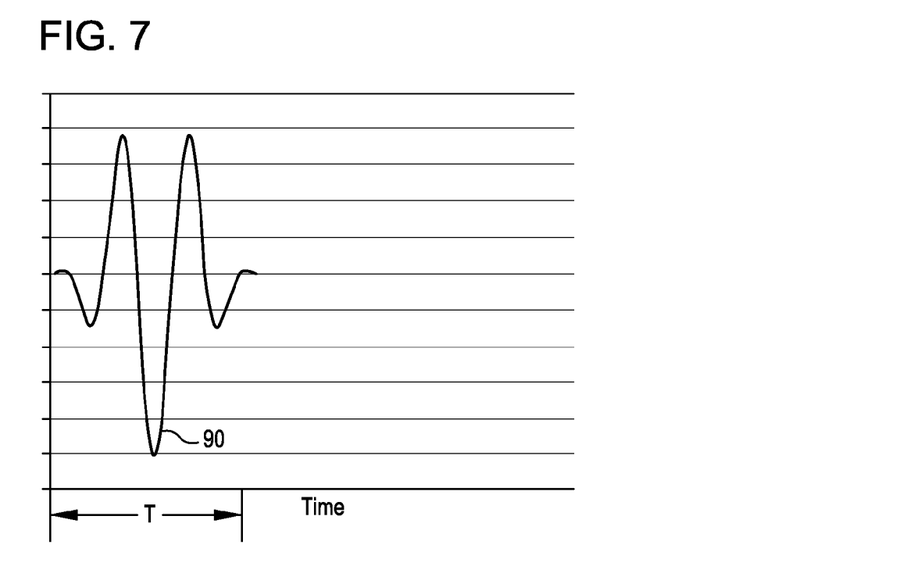
FIG. 7 is a plot of another signal that an embodiment of the mine-hunting apparatus of FIGS. 3-5 may generate to neutralize a mine.

FIG. 7 is a plot versus time of another embodiment of the acoustic wave 90 of FIG. 5. In this example, the wave 90 is an approximate sinusoid having an approximately constant frequency but having varying amplitude (increasing and then decreasing) over its duration T, which may be in the range of approximately 100 ms. Such a wave 90 may be called a burst wave.

Figure 8:
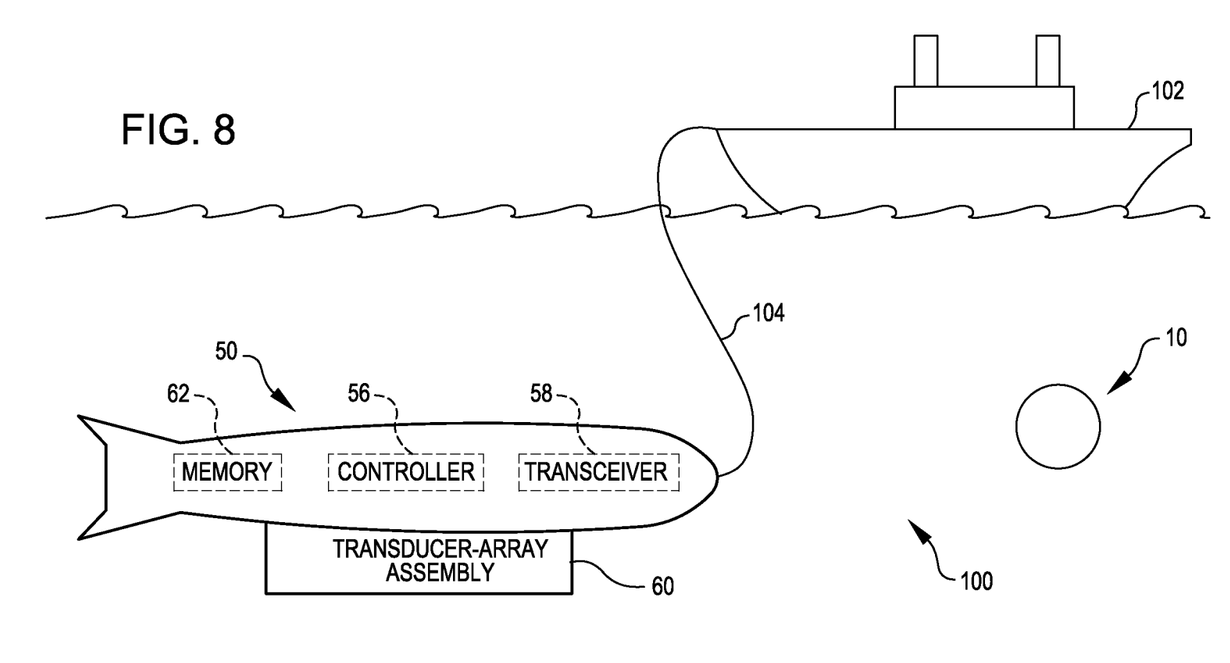
FIG. 8 is an embodiment of a mine-hunting system that includes an embodiment of the mine-hunting apparatus of FIGS. 3-5.

FIG. 8 is a diagram of an embodiment of a mine-hunting system 100 for locating, identifying, and neutralizing mines.

In addition to the vehicle 50, the system 100 includes a vessel, such as a ship, 102, and an optional umbilical cord 104 for tethering the apparatus to the ship, and for potentially providing power from the ship to the apparatus and allowing communications between the ship and apparatus. Where the umbilical cord 104 is omitted, the vehicle 50 may include its own power supply, and the communication transceiver 58 may allow communications between the ship and vehicle.

A human operator or a computer system (neither shown in FIG. 8) on board the ship 102 may generally perform, either directly or indirectly, any of the functions previously described as being performed by the controller 56. For example, the operator or computer system may command the controller 56 to perform the functions described above in conjunction with FIGS. 3-5, or the controller 56 may be omitted such that the operator or computer system directly controls the vehicle 50 and its components such as the transducer-array assembly 60. Or, the human operator or computer system on board the ship 102 may determine whether the mine 10 has been neutralized after the vehicle 50 generates the acoustic wave 90 (FIG. 5).

Alternate embodiments of the system 100 are contemplated. For example, one or more of the embodiments described above in conjunction with FIGS. 2-5 may be applicable to the system 100. Furthermore, although described as including a ship 102, the system 100 may include, in addition to or instead of the ship, a submarine, helicopter, aircraft, or spacecraft (e.g., without the cord 104 in the last two examples). Moreover, the transducer-array assembly 60 may be mounted to the ship 102 such that the remaining portions of the vehicle 50 may be omitted. In addition, although described for use in an ocean environment, the system 100 may be modified for use in other environments such as in the air, space, or ground (e.g., for land mines).

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A method, comprising:
generating a first acoustic wave having a first frequency;
disabling with the acoustic wave a device having a component with a resonance at approximately the first frequency;
generating a second acoustic wave;
directing the second acoustic wave toward the device;
identifying the device with a portion of the second acoustic wave reflected from the device; and
determining the resonance of the component in response to the identity of the device.

2. A method, comprising:
generating a first acoustic wave having a first frequency;
disabling with the acoustic wave a device having a component with a resonance at approximately the first frequency;
generating a second acoustic wave;
directing the second acoustic wave toward the device; and
determining the resonance of the component from a third acoustic wave that the component generates in response to the second acoustic wave.

3. A method, comprising:
generating a first acoustic wave having a first frequency;
disabling with the acoustic wave a device having a component with a resonance at approximately the first frequency;
generating a second acoustic wave;
directing the second acoustic wave toward the device; and
identifying the device in response to a third acoustic wave that the component generates in response to the second acoustic wave.

4. A method, comprising:
generating a first acoustic wave having a first frequency;
disabling with the acoustic wave a device having a component with a resonance at approximately the first frequency;
generating a second acoustic wave;
directing the second acoustic wave toward the device;
determining the resonance of the component from a third acoustic wave that the component generates in response to the second acoustic wave; and
identifying the device in response to the determined resonance of the component and in response to a portion of the second acoustic wave reflected by the device.

5. The method of claim 1, wherein disabling the device comprises destroying the device.

6. The method of claim 2, wherein disabling the device comprises destroying the device.

7. The method of claim 3, wherein disabling the device comprises destroying the device.

8. The method of claim 4, wherein disabling the device comprises destroying the device.

* * * * *